US008344556B2

(12) United States Patent
Gamble

(10) Patent No.: US 8,344,556 B2

(45) Date of Patent: Jan. 1, 2013

(54) FOAM PROPORTIONING SYSTEM WITH SOLID STATE CONTACTOR

(75) Inventor: Jonathan Gamble, Taylors Falls, MN (US)

(73) Assignee: Sta-Rite Industries, LLC, Delavan, WI (US)

(*) Notice: Subject to any disclaimer, the term of this patent is extended or adjusted under 35 U.S.C. 154(b) by 355 days.

(21) Appl. No.: 12/261,849

(22) Filed: Oct. 30, 2008

(65) Prior Publication Data

US 2009/0115259 A1 May 7, 2009

Related U.S. Application Data

(60) Provisional application No. 61/000,999, filed on Oct. 30, 2007.

(51) Int. Cl.
*H02B 1/24* (2006.01)

(52) U.S. Cl. ........ 307/131

(58) Field of Classification Search ........ 361/23; 307/131, 10.7
See application file for complete search history.

(56) References Cited

U.S. PATENT DOCUMENTS 5,036,422 A 7/1991 Uchida et al.
5,376,768 A * 12/1994 Pasquini et al. ........ 219/121.57
5,494,112 A * 2/1996 Arvidson et al. ........ 169/13
5,545,012 A 8/1996 Anastos et al.
5,856,711 A * 1/1999 Kato et al. ........ 307/10.6
6,225,797 B1 * 5/2001 Willis et al. ........ 323/351
6,283,717 B1 9/2001 Yamada
6,388,426 B1 * 5/2002 Yokoo et al. ........ 320/136
6,623,246 B2 9/2003 Hwang et al.
6,886,639 B2 * 5/2005 Arvidson et al. ........ 169/14
7,009,406 B2 * 3/2006 Naidu et al. ........ 324/536
7,033,141 B2 4/2006 Hong et al.
7,083,392 B2 8/2006 Meza et al.
7,096,681 B2 8/2006 Wills et al.
7,187,551 B2 * 3/2007 Fissore et al. ........ 361/702
7,408,755 B1 * 8/2008 Ye et al. ........ 361/93.1
7,699,053 B1 * 4/2010 Johnson et al. ........ 128/204.23
2002/0064463 A1 5/2002 Park et al.
2004/0213676 A1 10/2004 Phillips et al.
2005/0053471 A1 3/2005 Hong et al.
2006/0018764 A1 1/2006 Schnetzka et al.
2006/0056127 A1 3/2006 Lewis
2006/0145651 A1 7/2006 Sullivan

FOREIGN PATENT DOCUMENTS

FR 2688951 * 9/1993

* cited by examiner

*Primary Examiner* — Michael Rutland Wallis
(74) *Attorney, Agent, or Firm* — Quarles & Brady LLP

(57) ABSTRACT

Embodiments of the invention provide a foam proportioning system powered by a battery, with the system including a pump, a pump motor, and a solid state contactor. The solid state contactor includes a battery terminal connected to the battery, a load terminal connected to the pump motor, and an enable switch. The enable switch selectively connects the battery terminal and the load terminal in order to form a power line carrying a current from the battery to the pump motor. A state of the enable switch is based on the current being drawn through the power line by the pump motor. The enable switch is closed in order for the solid state contactor to provide power to the pump motor when the current through the power line is between about zero amps and about 80 amps.

27 Claims, 1 Drawing Sheet

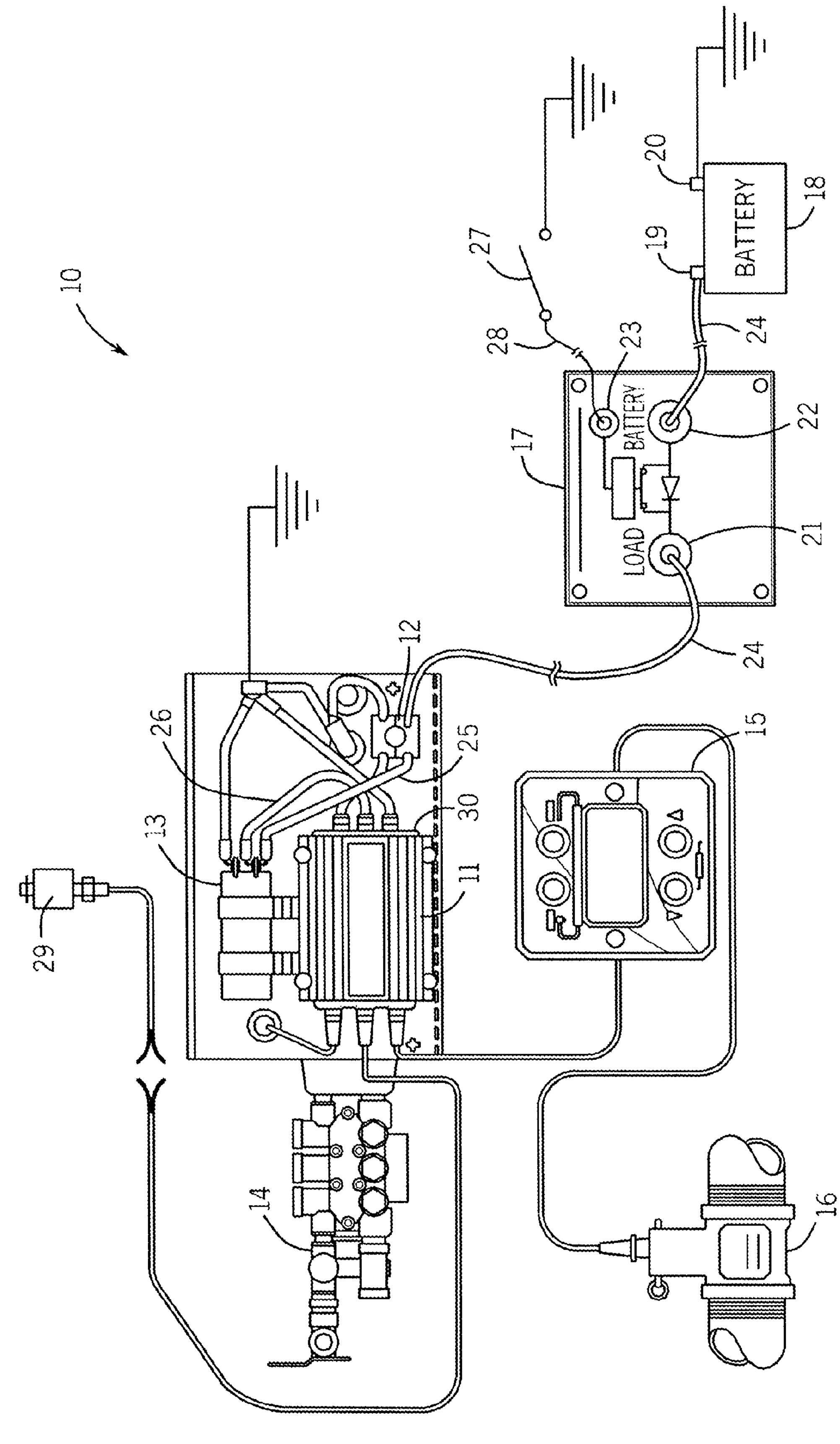
10
11
12
13
14
15
16
17
18
19
20
21
22
23
24
24
25
26
27
28
29
30
BATTERY
BATTERY
LOAD

FOAM PROPORTIONING SYSTEM WITH SOLID STATE CONTACTOR

RELATED APPLICATIONS

This application claims priority under 35 U.S.C. §119 to U.S. Provisional Patent Application No. 61/000,999 filed on Oct. 30, 2007, the entire contents of which is incorporated herein by reference.

BACKGROUND

Modern fire fighting equipment uses a foam proportioning system (FPS) to extinguish fires with a water-foamant solution. Generally, an FPS includes a pump to introduce foam into a water stream to provide the water-foamant solution. Electric motors are often used to drive these foam pumps. Conventionally, relays such as mechanical solenoids have been used to control the power flow to the FPS. However, the high in-rush current loads required during startup of the FPS can cause the relays to arc and burn out and cause system failure, rendering the FPS inoperable.

SUMMARY

Embodiments of the invention provide a FPS powered by a battery, with the FPS including a pump with a pump motor and a solid state contactor. The solid state contactor includes a battery terminal connected to the battery, a load terminal connected to the pump motor, and an enable switch. The enable switch selectively connects the battery terminal and the load terminal in order to form a power line carrying a current from the battery to the pump motor. A state of the enable switch is based on the current being drawn through the power line by the pump motor. The enable switch is closed in order for the solid state contactor to provide power to the pump motor when the current through the power line is between about zero amps and about 80 amps.

DESCRIPTION OF THE DRAWINGS

FIG. 1 is a schematic view of a foam proportioning system including a solid state contactor according to one embodiment of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings, whether mechanical or electrical. Further, "connected" and "coupled" are not restricted to physical, mechanical, or electrical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates a Foam Proportioning System (FPS) 10 according to one embodiment of the invention. The FPS 10 can include a motor driver box 11, a terminal block 12, a pump motor (behind the motor driver box 11, but not shown), a capacitor 13, a pump 14, a digital display 15, a flowmeter 16, a solid state contactor (SSC) 17, a battery 18 and a tank sensor 29. The pump 14 can be used to pump a foam from a foam tank into a water stream to create a mixed water-foamant solution. The pump motor can be a 24 volt DC motor and can drive the pump 14. The motor driver box 11 can control the pump motor. The motor driver box 11 (and therefore the pump motor) can be powered by the battery 18. The tank sensor 29 can sense low levels of foam in the foam tank. The flowmeter 16 can measure the flow rate of the water stream. The flowmeter 16 can be coupled to the digital display 15. The digital display 15 can be coupled to the motor driver box 11. The digital display 15 can be used by a user to select the proportion of foam in the water-foamant solution. Based on the user's selection, the digital display 15 can control the motor driver box 11 to control the pump motor and therefore the action of the pump 14 to create the desired water-foamant solution.

The battery 18 can be a conventional truck battery and can have a positive terminal 19 and a negative terminal 20. The input voltage provided by battery 18 can be in the range of about 10 $V_{DC}$ to about 29 $V_{DC}$. The battery 18 can be substituted with a power source providing similar voltage characteristics. The pump motor can be turned on by a power switch 30 on the motor driver box 11. The capacitor 13 can act as a ballast for the pump motor. In some embodiments, the capacitor 13 can be about 82,000 micro-farads.

The SSC 17 can include a load terminal 21, a battery terminal 22, and a control input terminal 23. In some embodiments, the load terminal 21 and the battery terminal 22 can be ⅜ inch-16 threaded stainless steel or ¼ inch-20 phosphor bronze, ET-plated studs with nuts and lock washers. The load terminal 21 and the battery terminal 22 can also be covered by rubber protective terminal boots. In some embodiments, the control input terminal 23 can be a 0.250-inch male faston blade terminal or an 8-32 threaded phosphor bronze ET-plated stud with a brass nut. The SSC 17 can have dimensions of about 2.50 inches×2.50 inches×0.33 inches. The back of the SSC 17 (the side opposite the terminals) can include a thermal transfer material and can be mounted to a metal mounting surface for proper heat dissipation. Examples of metal mounting surfaces include a frame rail or a ⅛ inch×16 inch×16 inch aluminum plate. The SSC 17 can weigh around 0.30 pounds or less.

The SSC 17 can couple the positive terminal 19 of the battery 18 to the terminal block 12 to form a series connection 24. The terminal block 12 can be coupled to the capacitor 13 via a connection 25 and the capacitor 13 can be coupled to the motor driver box 11 via a connection 26. The connections 24, 25, 26 can be electrical connections and can each be made by 4, 6, or 8 AWG size, chemically-resistant wire, depending on the length of wire needed to make each connection 24, 25, 26. The capacitor 13, the terminal block 12, and the negative terminal 20 of the battery 18 can be connected to ground with ground straps (e.g., 1¼ inch×1⁄16 inch flat braided ground straps). The SSC 17 can connect the battery 18 and the pump motor, and hereinafter, this connection through any components between the battery 18 and the pump motor can be referred to as the "power line" to the pump motor.

The SSC 17 can include an enable switch 27. In some embodiments, the enable switch 27 can be a ground-actuated toggle switch or a dry contact relay. When closed, the enable switch 27 can form a connection 28 between the control input terminal 23 and ground. Closing the enable switch 27 can enable (i.e., turn on) the SSC 17 and opening the enable switch 27 can disable (i.e., turn off) the SSC 17. The SSC 17 can provide power to the pump motor from the battery 18 when enabled (i.e., the enable switch 27 is closed) and the input voltage from the battery 18 is in the range of about 9 $V_{DC}$ to about 28 $V_{DC}$. The SSC 17 can also be disabled when the input voltage from the battery 18 is at or below about positive 8 $V_{DC}$, thus disconnecting power to the pump motor. The SSC 17 can be enabled within about 25 milli-seconds and the SSC 17 can be disabled within about 2 milli-seconds. In addition, The SSC 17 can be operational in the temperature range of about negative 40 degrees Fahrenheit to about positive 160 degrees Fahrenheit. The SSC 17 can draw about 15 milli-amps or less of current during operation and can draw an activation current of less than about 30 milli-amps. When in operation, the resistance between the load terminal 21 and the battery terminal 22 can be less than or equal to about 1.0 milli-ohms. When not in operation, the resistance between the load terminal 21 and the battery terminal 22 can be greater than or equal to about 250 kilo-ohms.

In other embodiments, the enable switch 27 can be a voltage-actuated switch and can be in connection with the positive terminal 19 when closed (not shown). The SSC 17 can then include a lug terminal for a connection to ground by a ground strap.

The SSC 17 can be capable of continuous operation at currents under about 70 amps through the power line to the pump motor. However, during start-up of the pump motor, the charging capacitor 13 can draw a large input current for a short time (e.g., about 200 milli-seconds). The SSC 17 can allow a "slow start" (i.e., gradual charging of the capacitor 13) when the pump motor is turned on to prevent arcing and possible damage to the FPS 10.

The SSC 17 can allow a large current draw for a period of time substantially long enough to charge the capacitor 13 during start-up. However, the SSC 17 can also provide overload current protection by disconnecting power to the pump motor if the pump motor is drawing a large current for a period of time (e.g., over about 80 amps after about 500 milli-seconds to about 700 milli-seconds). The overload disconnect can take less than about 25 milli-seconds if the current is between about 80 amps and about 250 amps and can take less than about 5 milli-seconds if the current is greater than about 250 amps. The SSC 17 can also be capable of withstanding a direct short of about 1200 amps for about 500 milli-seconds without being damaged and without disconnecting from the pump motor. In addition, the SSC 17 can be programmable to set different current cut-off ranges and times for use in various embodiments.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. Various features and advantages of the invention are set forth in the following claims.

The invention claimed is:

1. A foam proportioning system powered by a battery, the system comprising:
- a pump with a pump motor; and
- a solid state contactor including a single battery terminal connected to the battery, a single load terminal connected to the pump motor, and a non-load current carrying enable switch selectively connecting the single battery terminal in series with the single load terminal in order to form a power line carrying a positive load current from the battery to the pump motor;
  - selectively activating the enable switch based on the current drawn through the power line by the pump motor;
  - the enable switch being closed in order for the solid state contactor to provide power to the pump motor when the positive load current through the power line is between about zero amps and about 80 amps.

2. The system of claim 1 wherein the solid state contactor can withstand current through the power line of up to about 1200 amps for about 500 milli-seconds.

3. The system of claim 1 wherein the solid state contactor removes power from the pump motor if the pump motor attempts to draw greater than about 80 amps for longer than about 500 milli-seconds.

4. The system of claim 1 wherein the pump motor is a 24-volt direct current motor.

5. The system of claim 1 wherein the battery provides between about 10 volts to about 29 volts.

6. The system of claim 1 wherein the solid state contactor provides power to the pump motor when an input voltage from the battery is between about 9 volts and about 28 volts.

7. The system of claim 1 wherein the solid state contactor removes power from the pump motor when an input voltage from the battery is less than about 8 volts.

8. The system of claim 1 wherein the solid state contactor provides power within about 25 milli-seconds and can remove power within about 2 milli-seconds.

9. The system of claim 1 wherein at least one of the single battery terminal and the single load terminal is constructed of at least one of stainless steel and bronze.

10. The system of claim 1 wherein at least one of the single battery terminal and the single load terminal is covered by a rubber protective terminal boot.

11. The system of claim 1 wherein the solid state contactor includes a thermal transfer material on at least one side that is mounted to a metal mounting surface for heat dissipation.

12. The system of claim 1 wherein the enable switch is one of a ground-actuated toggle switch and a dry contact relay.

13. The system of claim 1 wherein the solid state contactor can operate in a temperature range of about negative 40 degrees Fahrenheit to about positive 160 degrees Fahrenheit.

14. The system of claim 1 wherein the solid state contactor draws up to about 15 milli-amps during operation of the pump motor.

15. The system of claim 1 wherein the solid state contactor draws an activation current of up to about 30 milli-amps.

16. The system of claim 1 wherein a resistance between the single load terminal and the single battery terminal is less than or equal to about 1 milli-ohm when power is provided to the pump motor.

17. The system of claim 1 wherein a resistance between the single load terminal and the single battery terminal is greater than or equal to about 250 kilo-ohms when power is removed from the pump motor.

18. The system of claim 1 and further comprising a capacitor connected to the pump motor; and wherein the solid state contactor gradually charges the capacitor when the pump motor is turned on in order to prevent arcing.

19. The system of claim 18 wherein the capacitor is about 82,000 micro-farads.

20. The system of claim 18 wherein the capacitor draws a larger input current for about 200 milli-seconds after the pump motor is started.

21. The system of claim 1 wherein the solid state contactor removes power from the pump motor within about 25 milliseconds if the current is between about 80 amps and about 250 amps.

22. The system of claim 1 wherein the solid state contactor removes power from the pump motor within about 5 milliseconds if the current is greater than about 250 amps.

23. The system of claim 1 wherein the single battery terminal of the solid state contactor is connected to a positive terminal on the battery.

24. The system of claim 1 wherein the solid state contactor carries only a positive load current between the battery and the single load terminal.

25. A proportioning system powered by a battery, the system comprising:

a pump with a pump motor to introduce a foamant into a fluid stream; and a solid state contactor including a single battery terminal connected to a positive terminal on the battery, a single load terminal connected to the pump motor, and a non-load current carrying enable switch selectively connecting the single battery terminal in a series connection to the single load terminal in order to form a power line through the solid state contactor, the power line carrying a positive load current from the battery to the pump motor;

selectively activating the enable switch based on the current drawn through the power line by the pump motor;

the state of the enable switch being operable to be closed in order for the solid state contactor to provide power to the pump motor when the positive load current through the power line is between a predefined range.

26. A foam proportioning system powered by a battery, the system comprising:

a pump with a pump motor; and a solid state contactor including a single battery terminal connected to the battery, a single load terminal connected to the pump motor, and a control input terminal for user connection of an input signal, the control input terminal connected to a non-load current carrying, user activatable enable switch to selectively activate and deactivate the solid state contactor;

the enable switch selectively activating the solid state contactor to connect the single battery terminal in series with the single load terminal in order to form a series connection through the solid state contactor to carry a current from the battery to the pump motor;

the enable switch being electrically connected to one of a positive terminal on the battery and a negative terminal on the battery to activate the solid state relay to form the series connection to carry the current from the battery to the pump motor only when the current through the series connection is between a predefined range.

27. The system of claim 26 wherein the predefined range is between about zero amps and about 80 amps.

* * * * *